United States Patent [19]

Condon, Jr. et al.

[11] 4,310,205
[45] Jan. 12, 1982

[54] THRUST WASHER RETAINING BAND

[75] Inventors: Charles E. Condon, Jr., Harwinton; Dean E. Johnston, Thomaston; Charles W. Shattuck, Goshen, all of Conn.

[73] Assignee: The Torrington Company, Torrington, Conn.

[21] Appl. No.: 128,855

[22] Filed: Mar. 10, 1980

[51] Int. Cl.³ .................. F16C 19/00; F16C 35/06
[52] U.S. Cl. ................................ 308/135; 308/236; 308/DIG. 11
[58] Field of Search ....... 308/236, 234, 231, DIG. 11, 308/235, 135

[56] References Cited

U.S. PATENT DOCUMENTS 3,532,402 10/1970 Beery et al. ..................... 308/236
3,918,779 11/1975 Halliger et al. .................. 308/236
3,999,816 12/1976 Pitner .............................. 308/239

FOREIGN PATENT DOCUMENTS 1047719 7/1953 France ........................... 308/236
2351307 12/1977 France ........................... 308/236
894743 4/1962 United Kingdom ....... 308/DIG. 11
1010792 11/1965 United Kingdom ............ 308/236

Primary Examiner—William D. Martin, Jr.
Attorney, Agent, or Firm—Frank S. Troidl

[57] ABSTRACT

An annular band fits over a thrust washer of a thrust bearing. At least one but preferably a plurality of circumferentially spaced radially extending protrusions are provided on the annular band. The protrusions are adapted to provide an interference fit between the thrust washer and the support such as a housing on which the thrust washer is mounted.

3 Claims, 4 Drawing Figures

THRUST WASHER RETAINING BAND

This invention relates to thrust bearings. More particularly, this invention is an annular band for a thrust washer and has at least one but preferably circumferentially spaced protrusions adapted to provide an interference fit between the annular band and the surface on which the thrust washer is mounted.

When a thrust bearing is inserted in or on a support such as a housing or a shaft, it is highly important that the stresses on the thrust washer as a result of the insertion of the thrust bearing into the support are kept to a minimum. Significant distortion of the washer surface must be prevented.

The invention is an annular band for a thrust bearing washer. The annular band has at least one protrusion. The protrusion may, for example, be formed, coined, molded, or lanced. The protrusion provides a means for retaining the thrust washer by an interference fit between the protrusion and the washer support, without any significant distortion to the washer. The annular band may be made from any suitable malleable material, such as mild steel, aluminum or plastic.

The invention, as well as its many advantages, may be further understood by reference to the following detailed description and drawings in which.

Figure 2:
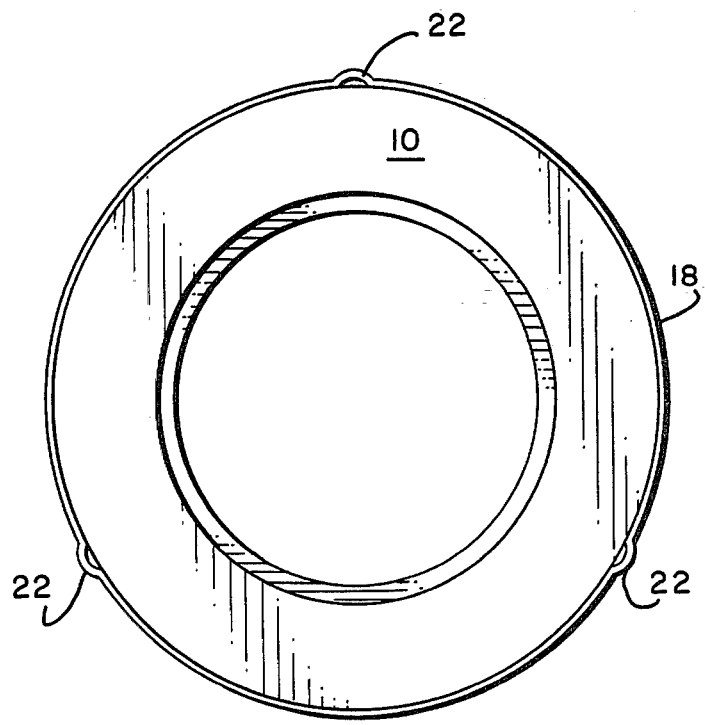
FIG. 2 is a front view of the thrust bearing of FIG. 1.
Figure 1:
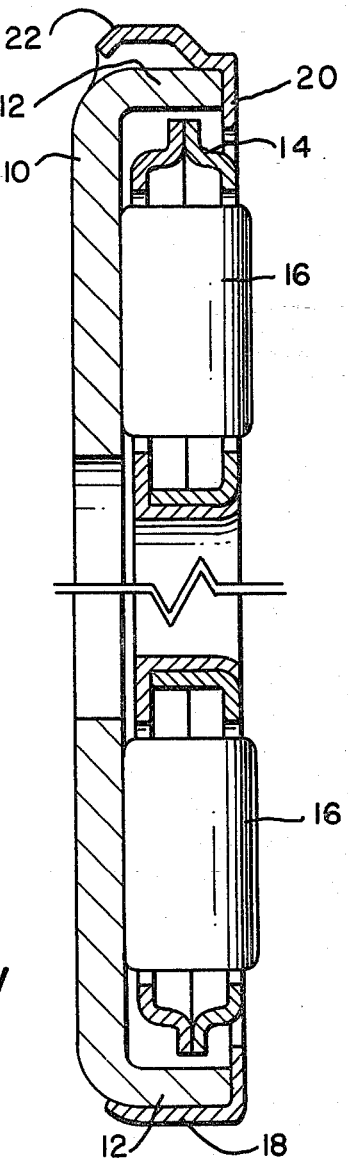
FIG. 1 is a sectional elevational view of a thrust bearing and illustrating one preferred embodiment of the invention.

Referring to the drawings, and more particularly to FIG. 1 and FIG. 2, the thrust bearing includes an annular thrust washer which has a radially extending portion 10 and an annular flange 12. An annular cage 14 has a plurality of circumferentially separated pockets in which are located rollers 16 which are adapted to roll along the radially extending portion 10.

The annular band for a thrust washer in accordance with this invention includes an axially extending annular portion 18 (see FIG. 1) which is adapted to fit over and engage the outside periphery of the flange 12 of the thrust washer. The inside periphery of the band 18 fits snuggly over the outside periphery of the flange 12. The annular band also includes an integral radially inwardly extending annular portion 20 which fits over the edge of flange 12 and is in contact with said edge. Annular portion 20 serves to retain the cage 14 within the thrust bearing. A plurality of circumferentially spaced protrusions 22 are provided on the band (see FIG. 2). The protrusions extend generally radially outwardly and are circumferentially spaced apart by an approximate 120° arc.

Figure 3:
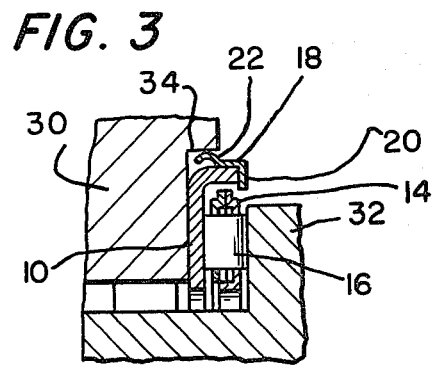
FIG. 3 is a view, partly in section, showing a thrust bearing including the new annular band, and inserted into the housing and about a shaft.

FIG. 3 shows the thrust bearing of FIG. 1 and FIG. 2 inserted in a counter bore of a housing 30. The housing 30 has a shaft 32 inserted therein. It can be seen that the protrusions 22 provide an interference fit with the counter bore 34 of the housing 30. The interference fit does not produce any significant distortion of the washer.

Figure 4:
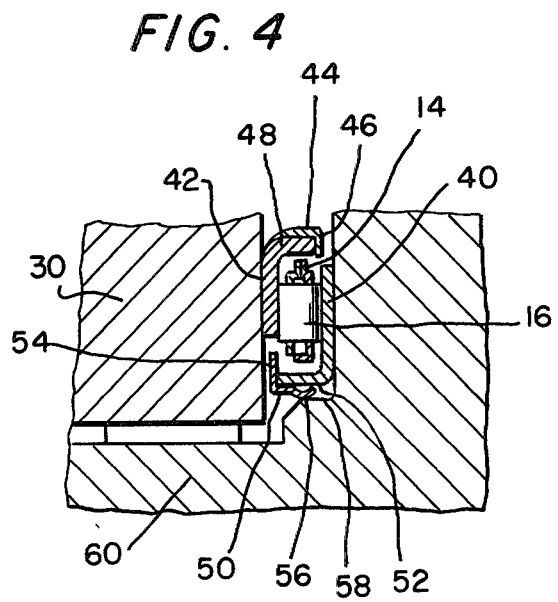
FIG. 4 is a view, partly in section, showing a thrust bearing including a second preferred embodiment of the invention, and inserted about a housing and onto a shaft.

FIG. 4 shows a thrust bearing with two axially separated thrust washers 40 and 42. A conventional annular band 44 with radially inwardly extending annular portion 46 for retaining roller cage 14 is mounted on annular flange 48 of thrust washer 42.

The annular band in the embodiment shown in FIG. 4 includes an annular portion 50 having its outside periphery in contact with axial flange 52 of thrust washer 40 and a radially outwardly extending integral annular portion 54 fitting over the edge of flange 52. A plurality of radially inwardly extending protrusions 56 provide an interference fit on shoulder 58 of shaft 60. Preferably, there are three protrusions 56 (only one shown in FIG. 4) circumferentially spaced apart by a 120° arc.

The annular band may be made from any suitable malleable material such as mild steel, aluminum, or plastic. Also, though the protrusions 22 are of a particular shape, the protrusions may be formed by various means and of different shapes such as being coined, molded, formed, or any other way, the important thing being that the protrusion, or protrusions, provides a band which when inserted over a thrust washer provides an interference fit in the support on which the thrust washer is mounted.

We claim:

1. A thrust bearing comprising: a thrust bearing washer having a radially-extending portion and an axial annular flange; a plurality of rollers adapted to roll along said radially-extending portion of the thrust bearing washer and a separate annular band having an axially-extending annular portion having a periphery engaging a periphery of the thrust washer flange, said band having at least one protrusion adapted to provide an interference fit between the annular band and the device on which the thrust washer is mounted.

2. The thrust bearing of claim 1 wherein: the inside periphery of said band axially-extending annular portion engages the outside periphery of the thrust washer annular flange and the band has a radially, inwardly-extending annular portion integrally connected to the axially-extending annular portion said radially-extending annular portion contacting the edge of the annular flange of the thrust washer.

3. A band in accordance with claim 2 wherein: there are three protrusions circumferentially spaced apart by an approximate 120° arc.

* * * * *